United States Patent
Ayala et al.

(10) Patent No.: US 12,547,633 B1
(45) Date of Patent: *Feb. 10, 2026

(54) MATCHING DATA ANALYTICS PARAMETERS USING PREDICTION MODELS

(71) Applicant: United Services Automobile Association (USAA), San Antonio, TX (US)

(72) Inventors: Jennifer Dawn Ayala, San Antonio, TX (US); Zachery C. Lake, Fort Wayne, IN (US); Sydney Ann Conrad-Cook, Van Meter, IA (US); Courtney St. Martin, Forney, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/746,830

(22) Filed: Jun. 18, 2024

Related U.S. Application Data

(63) Continuation of application No. 17/877,201, filed on Jul. 29, 2022, now Pat. No. 12,056,130.

(51) Int. Cl.
  *G06F 17/00* (2019.01)
  *G06F 16/242* (2019.01)
  (Continued)

(52) U.S. Cl.
  CPC .... *G06F 16/24575* (2019.01); *G06F 16/2428* (2019.01); *G06F 16/285* (2019.01)

(58) Field of Classification Search
  CPC ........... G06F 16/24575; G06F 16/2428; G06F 16/285
  See application file for complete search history.

(56) References Cited

U.S. PATENT DOCUMENTS

| | | |
|---|---|---|
| 5,913,201 A | 6/1999 | Kocur |
| 6,711,400 B1 | 3/2004 | Aura |
| | (Continued) | |

FOREIGN PATENT DOCUMENTS

CA    3084760 A1    12/2020

OTHER PUBLICATIONS

Shuo Zhang and Krisztian Balog. Auto-completion for Data Cells in Relational Tables. In Proceedings of the 28th ACM International Conference on Information and Knowledge Management (CIKM '19). Association for Computing Machinery, USA, 761-770. Nov. < https://doi.org/10.1145/3357384.3357932> (Year: 2019).*

(Continued)

*Primary Examiner* — Greta L Robinson
(74) *Attorney, Agent, or Firm* — Potomac Law Group, PLLC; Dannon G. Allbee

(57) ABSTRACT

Aspects of the present disclosure are directed to prediction models that match stored parameters to a new data analytics task. A data analytics task can refer to a task that analyzes and queries data sources to retrieve target data. Example parameters for a data analytics task include a task description, assigned individuals, relevant databases, relevant data tables, search queries, data table joins, etc. Implementations can store historical data analytics tasks and their task parameters. Prediction model(s) can be provided new data analytics task parameters and predict matching historical data analytics tasks for the new task. The matching data analytics tasks can then be analyzed to select data tables common among them, and the common data tables can be provided to a user. Implementations can also group additional parameters according to a selected common data table and provide the grouped additional parameters to the user.

20 Claims, 9 Drawing Sheets

(51) Int. Cl.
*G06F 16/2457* (2019.01)
*G06F 16/28* (2019.01)

(56) References Cited

U.S. PATENT DOCUMENTS

| | | | |
|---|---|---|---|
| 7,617,117 | B2 | 11/2009 | Starkey |
| 8,239,249 | B1 | 8/2012 | Belko et al. |
| 8,554,674 | B1 | 10/2013 | Subealdea et al. |
| 8,799,243 | B1 | 8/2014 | Havlik |
| 8,817,961 | B1 | 8/2014 | Sterman |
| 8,874,619 | B2 | 10/2014 | Mack |
| 9,706,401 | B2 | 7/2017 | Vincent et al. |
| 10,149,156 | B1 | 12/2018 | Tiku et al. |
| 10,154,025 | B2 | 12/2018 | Tinnakornsrisuphap et al. |
| 10,218,695 | B1 | 2/2019 | Jain |
| 10,346,762 | B2 | 7/2019 | Greenspan et al. |
| 10,445,732 | B2 | 10/2019 | Oberheide et al. |
| 10,659,459 | B1 | 5/2020 | Gadwale |
| 10,958,774 | B1 | 3/2021 | Harding |
| 11,461,368 | B2 * | 10/2022 | Das ............... G06F 16/285 |
| 11,734,609 | B1 * | 8/2023 | Breckenridge ........ G06N 20/00 706/12 |
| 11,930,032 | B2 | 3/2024 | Campbell |
| 12,056,130 | B1 * | 8/2024 | Ayala ............... G06F 16/24575 |
| 2002/0078381 | A1 | 6/2002 | Farley et al. |
| 2003/0028411 | A1 | 2/2003 | Grenchus, Jr. et al. |
| 2003/0110381 | A1 | 6/2003 | Aoshima et al. |
| 2004/0186852 | A1 | 9/2004 | Rosen |
| 2005/0055230 | A1 | 3/2005 | Chen |
| 2005/0055231 | A1 | 3/2005 | Lee |
| 2006/0053296 | A1 | 3/2006 | Busboom et al. |
| 2008/0086342 | A1 | 4/2008 | Curry et al. |
| 2008/0181379 | A1 | 7/2008 | Chow et al. |
| 2008/0288317 | A1 | 11/2008 | Kakar |
| 2008/0306750 | A1 | 12/2008 | Wunder et al. |
| 2011/0149867 | A1 | 6/2011 | Rudolf et al. |
| 2011/0219427 | A1 | 9/2011 | Hito et al. |
| 2011/0270751 | A1 | 11/2011 | Csinger et al. |
| 2012/0072460 | A1 | 3/2012 | Friedlander et al. |
| 2012/0198531 | A1 | 8/2012 | Ort et al. |
| 2012/0239585 | A1 | 9/2012 | Bailey |
| 2013/0262857 | A1 | 10/2013 | Neuman et al. |
| 2014/0058801 | A1 | 2/2014 | Deodhar et al. |
| 2014/0108656 | A1 | 4/2014 | Salinca et al. |
| 2014/0223516 | A1 | 8/2014 | Vongsouvanh et al. |
| 2014/0230039 | A1 | 8/2014 | Prakash et al. |
| 2015/0248532 | A1 | 9/2015 | Rajasenan |
| 2015/0334108 | A1 | 11/2015 | Khalil et al. |
| 2017/0068958 | A1 | 3/2017 | Oberheide et al. |
| 2017/0091670 | A1 * | 3/2017 | Gulin ..................... G06N 5/022 |
| 2017/0250974 | A1 | 8/2017 | Antonyraj et al. |
| 2018/0034798 | A1 | 2/2018 | Vincent et al. |
| 2018/0041339 | A1 | 2/2018 | Lee |
| 2018/0332042 | A1 | 11/2018 | Yu et al. |
| 2018/0341782 | A1 | 11/2018 | Barday et al. |
| 2019/0074972 | A1 | 3/2019 | Shastri et al. |
| 2019/0156291 | A1 | 5/2019 | Nayak et al. |
| 2019/0207981 | A1 | 7/2019 | Sweeney et al. |
| 2019/0297075 | A1 | 9/2019 | Kaladgi et al. |
| 2019/0312726 | A1 | 10/2019 | Sierra et al. |
| 2019/0327226 | A1 | 10/2019 | Brown et al. |
| 2019/0386984 | A1 | 12/2019 | Thakkar et al. |
| 2020/0029268 | A1 | 1/2020 | Russell et al. |
| 2020/0125586 | A1 * | 4/2020 | Rezaeian ................ G06F 3/048 |
| 2020/0236113 | A1 | 7/2020 | Monica et al. |
| 2020/0250782 | A1 | 8/2020 | Zaich et al. |
| 2021/0019665 | A1 * | 1/2021 | Gur ........................ G06N 20/00 |
| 2021/0092227 | A1 | 3/2021 | Naujok et al. |
| 2021/0152689 | A1 | 5/2021 | Gayaldo |
| 2022/0014169 | A1 * | 1/2022 | Caron ................... H03H 9/605 |
| 2022/0270021 | A1 | 8/2022 | Glocker |
| 2024/0086859 | A1 | 3/2024 | Gillam |
| 2024/0272944 | A1 | 8/2024 | Cooke et al. |

OTHER PUBLICATIONS

Maria Vaida, et al., "Semi-Supervised Graph Neural Network with Probabilistic Modeling to Mitigate Uncertainty". In Proceedings of the 2020 the 4th International Conference on Information System and Data Mining, Association for Computing Machinery, 152-156, May (Year: 2020).

Alexandre Alapetite, "Dynamic 2D-barcodes for multi-device Web session migration including mobile phones", Technical University of Denmark, Department of Management Engineering Produktionstorvet 426-A, DK-2800 Kongens Lyngby, Denmark, doi: 10.1007/ s00779-009-0228-5. (Year: 2010).

* cited by examiner

MATCHING DATA ANALYTICS PARAMETERS USING PREDICTION MODELS

CROSS-REFERENCE TO RELATED APPLICATION(S)

This application is a continuation of U.S. patent application Ser. No. 17/877,201, filed Jul. 29, 2022, titled "Matching Data Analytics Parameters Using Prediction Models," which is herein incorporated by reference in its entirety.

TECHNICAL FIELD

The present disclosure is directed to prediction models that match stored parameters to a new data analytics task.

BACKGROUND

Organizations can generate volumes of data, much of which is maintained in storage. For example, historical data can be analyzed to optimize performance for a given organization. However, data growth has added layers of complexity to this analysis. Moreover, finding and retrieving data relevant to such an analysis from a complex set of data structures can be a convoluted task due to murky data. For example, analysts often must have extensive experience with the organization's data set to select the subset needed for a task and when they don't have this experience rely on help from team members to select the relevant data. This result in a subjective analysis which can miss important data or take significant amounts of time. Providing understandable insights on this complex data can significantly improve data access and exploration.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
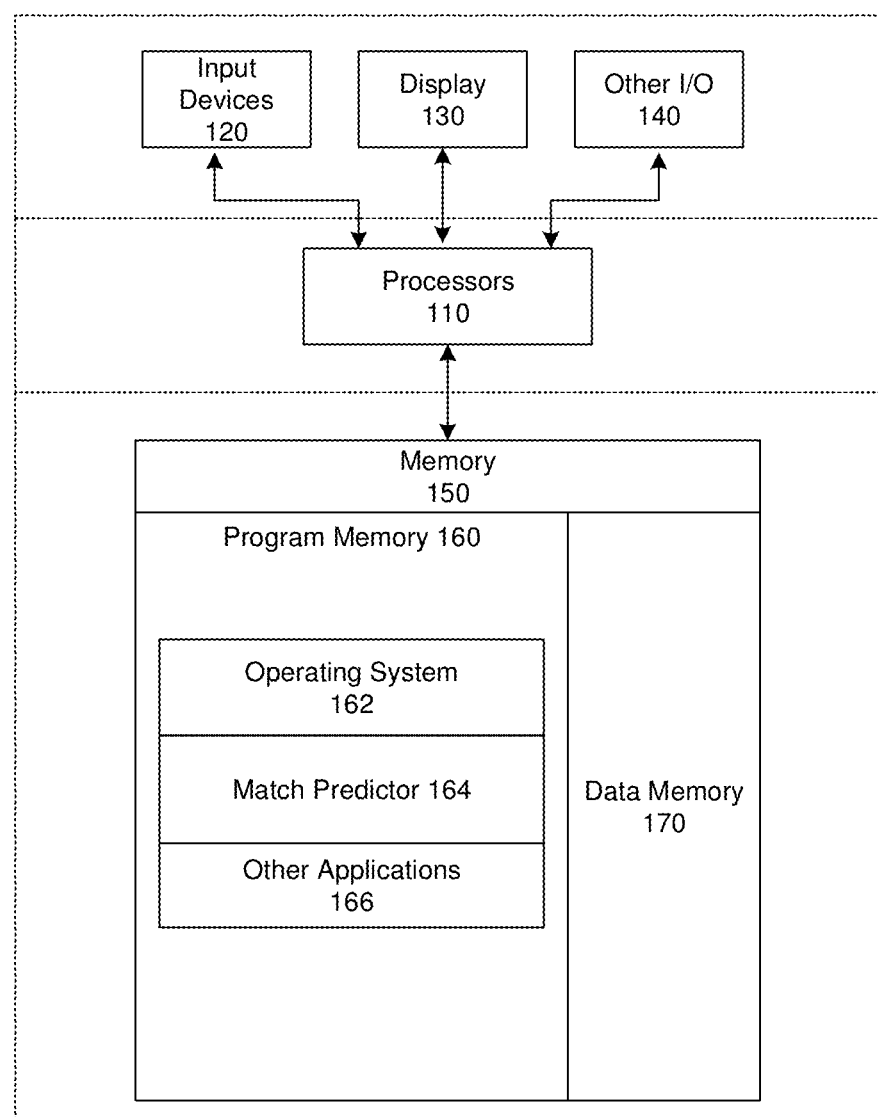
FIG. 1 is a block diagram illustrating an overview of devices on which some implementations can operate.

Aspects of the present disclosure are directed to prediction models that match stored parameters to a new data analytics task, analyze the matches, and provide selective matches to a user. A data analytics task can refer to a task that queries one or more data sources (e.g., databases) to retrieve target data and analyze the results. For example, a data analytics task can comprise parameters, such as a task description (e.g., natural language description of the target data), assigned individuals (e.g., person assigned the task), requesting entity (e.g., name of requesting person, department, and the like), relevant databases, relevant data tables, relevant data columns, search queries (e.g., structured query language (SQL) queries, or other suitable queries), data table joins, data table views, and other suitable parameters. Implementations can store historical data analytics tasks and their task parameters, for example in a database, such that one or more prediction models can match a new task to the historical tasks/task parameters.

In some implementations, a task data aggregator can aggregate the relevant parameters related to a historical data analytics task and store the task in association with the parameters. For example, a workflow for performing a data analytics task can include a portion where the assigned individual performing the task inputs the relevant parameters into a user interface (e.g., web forms), and the task data aggregator can receive the input and store the provided data. In some implementations, parameters related to a data analytics task can be extracted from search queries that accomplish the data analytics task. For example, a parameter extractor can extract elements from an SQL query, such as the relevant data tables, data fields, data table joins, data views, and the like. These extracted elements can then be stored as parameters for a given data analytics task.

In some implementations, a match predictor can predict stored data analytics task/task parameters that match a new data analytics task. For example, parameters for the new data analytics task can be received by the match predictor, such as one or more of a task description, assigned individual(s), requesting entity, target databases, or any combination thereof. The match predictor can predict which historical data analytics tasks and task parameters match parameters for the new data analytics task. For example, a prediction model can receive, as input, the parameters for the new data analytics task and output matching data analytics tasks. Implementations of the prediction model can be an unsupervised machine learning model, semi-supervised machine learning model, and/or a supervised learning model. For example, the prediction model(s) can be trained/configured to assess similarities between the new task parameters (e.g., input data) and the historical data analytics tasks/task parameters (e.g., data corpus) and output matching historical tasks with a similarity that meets or exceeds a criteria (e.g., similarity metric above a threshold). In some cases, the prediction model(s) can perform unsupervised clustering of the tasks, such as by repeatedly assigning tasks to clusters until the clusters don't change significantly between iterations of task clustering. Once the clusters are defined, the cluster with the new task can be selected.

In some implementations, the matching tasks can be analyzed and selective matches can be provided to a user. In an example where the prediction model(s) output a set of matching data analytics tasks, data tables relevant to the set of data analytics tasks can be determined/retrieved. These data tables can be analyzed to determine which of them meet a criteria. For example, for each data table, the number of data analytics tasks from the set (e.g., set of matching data analytics tasks) that include the data table as a parameter can be calculated, and the data tables can be ranked by this calculated commonality number. This ranking can indicate how commonly a data table was used when performing the set of matching historical data analytics tasks. In some implementations, the data tables that meet the criteria can include a defined number (e.g., 5, 7, 10, etc.) of highest ranked data tables, or data tables that meet at least a threshold commonality number. In some implementations, the data tables that meet one or more of these example criteria can be provided to a user.

In some implementations, parameter values for additional parameters can be grouped according to the data tables that meet the criteria. For example, for a given data table that meets the criteria, a subset of the set of matching historical data analytics tasks will include the given data table as a parameter. In some implementations, parameter values from the subset of historical data analytics tasks can be grouped for individual parameters. For example, assigned individuals from the subset of tasks can be grouped, task descriptions from the subset of tasks can be grouped, stored queries from the subset of tasks can be grouped, table joins from the subset of tasks can be grouped, table columns from the subset of tasks can be grouped, etc.

In some implementations, a user can select a provided data table (e.g., a data table that meets the criteria), and the user can then be provided with grouped parameter values for one or more additional parameters relevant to the selected data table. For example, using an input form on a user interface (e.g., drop-down menu, or any other suitable input element) a user can select a provided data table. The user can then be presented a list of additional parameters (e.g., via a drop-down menu, or any other suitable input element) that have been grouped according to the selected data table. Upon selection of one of the additional parameters, the user can be provided with parameter values grouped within the selected additional parameter. For example, given the "task description" additional parameter, the grouped values include task descriptions from historical data analytics tasks that: are predicted to match the new data analytics task; and include the selected data table as a parameter.

The group of task descriptions can provide the user natural language descriptions of historical data analytics tasks (e.g., predicted to match the new data analytics task) that were accomplished by retrieving data from the selected data table. Reviewing these natural language descriptions can provide knowledge to the user about how the selected data table has been historically used to accomplish analytics tasks that match the user's new analytics task. In another example, when "table joins" is selected as the additional parameter, the displayed group of table joins can indicate to the user which tables have been joined with the selected table to accomplish historical data analytics tasks. In another example, when "assigned individuals" is selected as the additional parameter, the displayed group of assigned individuals can indicate to the user which individuals have used the selected table to accomplish historical data analytics tasks (predicted to match the new task). Each of these insights can provide depth to organization data that has grown murky and improve data access.

In some implementations, an initial set of parameters for a new data analytics task may be limited, and therefore augmenting the parameters can result in higher quality matches predicted by the prediction model(s). For example, one or more prediction models can be used to predict an initial set of matching parameters from historical data analytics tasks/parameters using the limited parameters for the new task (e.g., task description). The initial set of matching parameters can include assigned individuals, requesting entity, task descriptions, or any other suitable parameters. One or more of the initial set of matching parameters can be used to augment the limited parameters for the new data analytics task. For example, an original task description for the new task can be augmented with one or more of assigned individuals predicted to match the original task description, requesting entity predicted to match the original task description, additional task descriptions predicted to match the original task description, or any other suitable initial matching parameters. In this example, the original task description augmented with one or more parameters can then be used to retrieve a full set of matching historical data analytics tasks. This full set of matching historical data analytics tasks can then be analyzed such that selective matches are provided to the user.

Implementations improve upon data exploration and retrieval techniques by providing insights about how databases and data tables are used to accomplish real-world data analytics. Organizations conventionally suffer from data expansion and murky data that is challenging to understand in a real-world context. For example, a specific cross-section of data that can be readily expressed in a natural language description can ultimately pose significant challenges for retrieval when targeting data structures using queries. Conventional systems tend to add complexity by building extra layers of metadata, a logical model, or other layers that abstract data retrieval. However, these systems add more complexity to the existing data models, as the extra layers require manual effort to generate, require maintenance/ updating, and/or consume excess computing resources to perform data retrieval tasks. Accordingly, while these extra layers can provide some benefits, there are also significant drawbacks.

Embodiments provide insights about how data tables are used to perform real-world data analytics. For example, machine learning models can match historical data analytics tasks to parameters for a new data analytics task, and data table(s) relevant to the matching historical data analytics tasks can be selected for display to the user. Accordingly, data sources relevant to the new data analytics tasks can be determined and provided to a user.

Some implementations provide additional insights by grouping additional parameters according to a selected data table and using the matching historical data analytics tasks. The additional parameters grouped according to the selected data table can communicate to the user: how the selected data table was used to perform historical data analytics tasks, such as within stored queries, how table joins were performed, etc. (e.g., by providing the queries, scripts, or code blocks used in the tasks determined to best match the new task); which assigned individuals have experience with performing data analytics tasks using the selected table; and/or natural language understanding that indicates what target data was retrieved at least partly from the selected table. In addition, because the common data table selection and additional parameter groupings are performed using the set of matching historical data analytics tasks (e.g., tasks predicted to match the new data analytics task), the insights are configured to be particularly valuable to the new data analytics task.

Several implementations are discussed below in more detail in reference to the figures. FIG. 1 is a block diagram illustrating an overview of devices on which some implementations of the disclosed technology can operate. The devices can comprise hardware components of a device 100 that select data analytics task components by matching stored parameters to a new data analytics task using one or more prediction models. Device 100 can include one or more input devices 120 that provide input to the Processor(s) 110 (e.g., CPU(s), GPU(s), HPU(s), etc.), notifying it of actions. The actions can be mediated by a hardware controller that interprets the signals received from the input device and communicates the information to the processors 110 using a communication protocol. Input devices 120 include, for example, a mouse, a keyboard, a touchscreen, an infrared sensor, a touchpad, a wearable input device, a camera- or image-based input device, a microphone, or other user input devices.

Processors 110 can be a single processing unit or multiple processing units in a device or distributed across multiple devices. Processors 110 can be coupled to other hardware devices, for example, with the use of a bus, such as a PCI bus or SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The processors 110 can have access to a memory 150 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, match predictor 164, and other application programs 166. Memory 150 can also include data memory 170, e.g., historical analytics task information and parameters, criteria data, threshold data, organization data, human resources data, configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
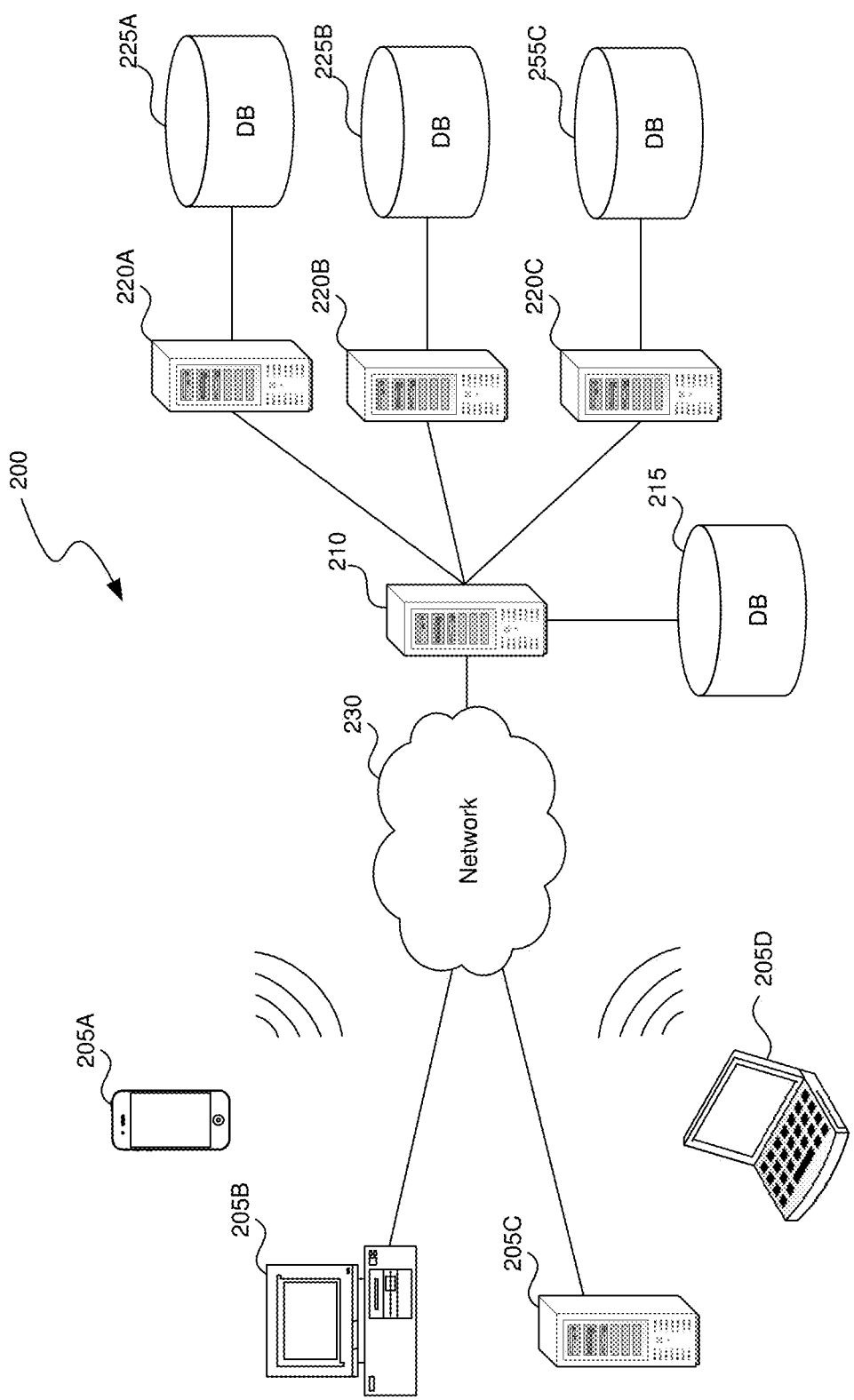
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g., store) information such as historical analytics task information and parameters, criteria data, threshold data, organization data, human resources data, and other suitable data. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
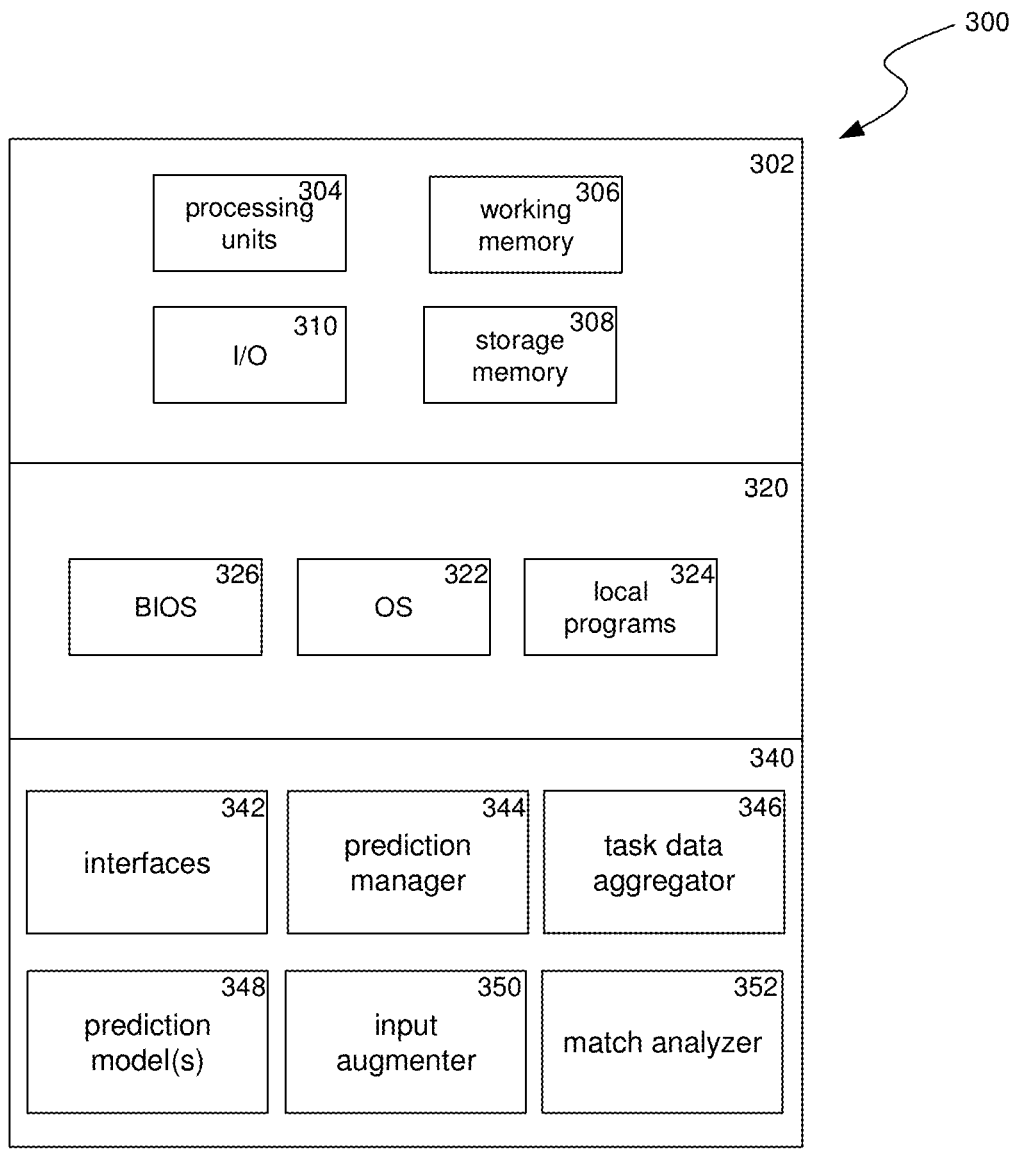
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include prediction manager 344, task data aggregator 346, prediction model(s) 348, input augmenter 350, matches analyzer 352, and components which can be used for providing user interfaces, transferring data, and controlling the specialized components, such as interfaces 342. In some implementations, components 300 can be in a computing system that is distributed across multiple computing devices or can be an interface to a server-based application executing one or more of specialized components 340. Although depicted as separate components, specialized components 340 may be logical or other nonphysical differentiations of functions and/or may be submodules or code-blocks of one or more applications.

Prediction manager 344 can predict historical data analytics tasks that match a new data analytics task. In some implementations, prediction manager 344 can receive parameters for a new data analytics task from a user, such as a task description, assigned individual(s), a requesting entity (e.g., individual at the organization, organizational department, etc.), or any combination thereof. For example, prediction manager 344 can provide the parameters for a new data analytics task to prediction model(s) 348, which can generate the matching analytics tasks/parameters. Once the matches are generated, prediction manager 344 can provide the matches to match analyzer 352. Match analyzer 352 can select portions of the generated matches to provide to a user. Prediction manager 344 can then provide selective portions of the matches to the user, such as via a user interface.

Task data aggregator 346 can aggregate task information and task parameters to store a corpus of historical data analytics tasks and parameters. A data analytics task can refer to a task that analyzes and queries one or more data sources (e.g., databases) to retrieve target data. In some implementations, a given historical data analytics task can include parameters relevant to performing the given data analytics task. Example parameters include a task description (e.g., natural language description of the target data), assigned individuals (e.g., person assigned the task), requesting entity (e.g., name of requesting person, department, and the like), relevant databases, relevant data tables, relevant data columns, search queries (e.g., SQL queries, or other suitable queries), data table joins, data table views, and other suitable parameters.

In some implementations, task data aggregator 346 can receive historical data analytics task parameters from a user, from performance of the data analytics tasks, by extracting new parameters from existing parameters, or by any other suitable means. For example, a workflow for performing a data analytics task can include a portion where the assigned individual performing the task inputs relevant parameters into a user interface (e.g., web forms), and task data aggregator 346 can receive the input and store the provided data.

In another example, the search queries (e.g., SQL) used to accomplish the data analytics task can be tracked and stored by task data aggregator 346.

In some implementations, parameters related to a data analytics task can be extracted from the search queries that accomplish the data analytics task. For example, parameters can be extracted from a SQL query, such as the relevant data tables, data fields, data table joins, data views, query functions, and the like. Task data aggregator 346 can then store the extracted elements as parameters for a given historic data analytics task. In some implementations, parameters can be recognized within a SQL query by parsing/tokenizing the query, identifying predefined keywords, sequences of keywords, and/or special characters (e.g., SELECT, FROM, WHERE, SUM, COUNT, AVG, JOIN, INNER JOIN, LEFT JOIN, RIGHT JOIN, FULL JOIN, ON, and the like), and extracting parameters based on the known syntax of SQL expressions. For example, in the SQL statement "SELECT AAA.BBB FROM AAA", the element AAA represents a data table and the element BBB represents a data column in the AAA data table. Other known syntax can be used to extract additional parameters. Any other suitable techniques to extract additional parameters from queries, such as SQL queries, can be implemented, such as existing libraries, software, and the like.

Prediction model(s) 348 can be any suitable model configured to predict matches between parameters of a new data analytics task and historical data analytics tasks/parameters, for example within a data corpus aggregated by task data aggregator 346. Prediction model(s) 348 can be machine learning models configured using the data corpus, such as supervised machine learning models, semi-supervised machine learning models, or unsupervised machine learning models. For example, an unsupervised machine learning model can learn from a data corpus without data labels, for example by using one or more clustering algorithms. Implementations of prediction model(s) 348 can include unsupervised learning models such as hierarchical clustering, K-means clustering, K nearest neighbor, or any other suitable unsupervised learning model.

In some implementations, prediction manager 344 can provide parameters for a new data analytics task to prediction model(s) 348, which can predict matching analytics tasks/parameters selected from the data corpus. The output from prediction model(s) 348 can be a listing of historical data analytics tasks predicted to match the new data analytics task parameters, a listing of historical data analytics task parameters predicted to match the new data analytics task parameters, or any combination thereof. The predicted matches from prediction model(s) 348 can be provided to match analyzer 352, which can select portions of the generated matches to provide to a user.

Input augmenter 350 can augment the parameters received for a new data analytics task with an initial set of matching parameters. For example, the parameters for a new data analytics task received by prediction manager 344 may be limited, and therefore augmenting the parameters may generate higher quality matches (predicted by prediction model(s) 348). In some implementations, prediction model(s) 348 can be used to predict an initial set of matching parameters from the data corpus (e.g., historical data analytics tasks/parameters aggregated by task data aggregate 346) using the limited parameters for the new task. For example, the limited parameters for the new data analytics task can be a brief task description and a single assigned individual.

Example initial matching parameters predicted by prediction model(s) 348 using the limited parameters can include additional assigned individuals, a requesting entity, one or more additional task descriptions, or any other suitable parameters. Input augmenter 350 can augment the limited parameters for the new data analytics task with one or more of the initial matching parameters. For example, a task description and single assigned individual for the new task can be augmented with one or more additional assigned individuals predicted to match the limited parameters, a requesting entity predicted to match the limited parameters, one or more additional task descriptions predicted to match the limited parameters, any combination thereof, or any other suitable initial matching parameters. In this example, prediction manager 344 can provide the limited parameters augmented with the one or more initial matching parameters to prediction model(s) 348 to predict a full set of matching historical data analytics tasks/parameters. Prediction manager 344 can provide this full set of matching historical data analytics tasks/parameters to match analyzer 352, which can select portions of the full set of matches to provide to a user.

Match analyzer 352 can receive matches for a new data analytics task, such as matching historical data analytics tasks, and analyze the matches to select a portion of the matches to provide to a user. For example, prediction manager 344 can provide matches to match analyzer 352 that comprise matching historical data analytics tasks from the data corpus (e.g., historical data analytics tasks/parameters aggregated by task data aggregate 346). In some implementations, match analyzer 352 can determine data tables relevant to the matching historical data analytics tasks. For example, each historical data analytics task in the data corpus includes parameters, such as data tables. Match analyzer 352 can retrieve the data table parameters stored in association with each of the matching historical data analytics tasks. Any other suitable technique to retrieve the data tables relevant to the matching historical data analytics tasks can be implemented.

Match analyzer 352 can analyze the determined/retrieved data tables, such as by comparing the data tables to a criteria. For example, for each data table, the number of matching historical data analytics tasks that include the data table as a parameter can be calculated. This calculated number can represent a commonality for the data tables among the matching historical data analytics tasks. In some implementations, match analyzer 352 can rank the data tables according to this calculated commonality number. The ranking can indicate how commonly a data table was used when performing the matching historical data analytics tasks. In some implementations, the data tables that meet the criteria can include a defined number (e.g., 5, 7, 10, etc.) of highest ranked data tables or data tables that meet at least a threshold commonality number. Any other suitable technique can be used to select data tables using matching historical data analytics tasks.

In some implementations, prediction manager 344 can provide the selected data tables (e.g., data tables that meet the criteria) to a user. Input can then be received from the user that selects one of the provided data tables. For example, using an input form on a user interface (e.g., drop-down menu, or any other suitable input element) a user can select a provided data table. This selection permits match analyzer 352 to provide the user with additional information that demonstrates to the user how the selected data table was used during performance of the matching historical data analytics tasks. For example, f prediction manager 344 and match analyzer 352 can provide the user additional parameters grouped under the selected data table (e.g., additional parameters from a subset of the historical matching data analytics tasks that include the selected data table as a parameter).

In some implementations, match analyzer 352 can group parameter values for additional parameters according to the selected data table and the matching historical data analytics tasks. For example, for a selected data table, a subset of the matching historical data analytics tasks will include the selected data table as a parameter. For a given additional parameter (e.g., assigned individuals, task descriptions, table joins, stored queries, etc.), match analyzer 352 can retrieve parameter values from these matching historical data analytics tasks that include the given data table and group the parameter values. For example, the matching historical data analytics tasks that comprise the selected data table as a parameter can include several assigned individuals as parameters, and match analyzer 352 can group the several assigned individuals. In this example, the several assigned individuals represent an additional parameter for the selected data table because the assigned individuals are likely to have performed a historic data analytics task using the selected data table.

In another example, the matching historical data analytics tasks that comprise the selected data table as a parameter can include several task descriptions as parameters, and match analyzer 352 can group the several task descriptions. In another example, the matching historical data analytics tasks that comprise the selected data table as a parameter can include one or more data table joins as parameters, and match analyzer 352 can group the data table joins. Match analyzer 352 can provide the additional parameters and grouped parameter values (for the selected data table) to prediction manager 344.

In some implementations, according to the data table the user selected, prediction manager 344 can provide the user the additional parameters and parameter values grouped for the selected data table. For example, where the additional parameters include assigned individuals, task descriptions, and data table joins, the user can be presented an input element at a user interface (e.g., drop-down menu, or any other suitable input element) that lists these additional parameters. Using the input element, the user can select an additional parameter to view.

Upon selection, the user can be displayed the additional parameter values grouped for the selected data table. For example, when the user selects the task description additional parameter, the group of task descriptions displayed to the user includes task descriptions from matching historical data analytics tasks (e.g., that match a new data analytics task) that include the selected data table as a parameter. This group of task descriptions can provide the user natural language descriptions of historical data analytics tasks (e.g., predicted to match the new data analytics task) that were accomplished by retrieving data from the selected data table. Reviewing these natural language descriptions can provide knowledge to the user about how the selected data table has been historically used to accomplish data analytics tasks that match the user's new analytics task.

In another example, when table joins is selected as the additional parameter, the displayed group of table joins can indicate to the user which tables have been joined with the selected table to accomplish historical data analytics tasks. In another example, when assigned individuals is selected as the additional parameter, the displayed group of assigned individuals can indicate to the user which individuals have used the selected table to accomplish historical data analytics tasks (predicted to match the new task).

Figure 4:
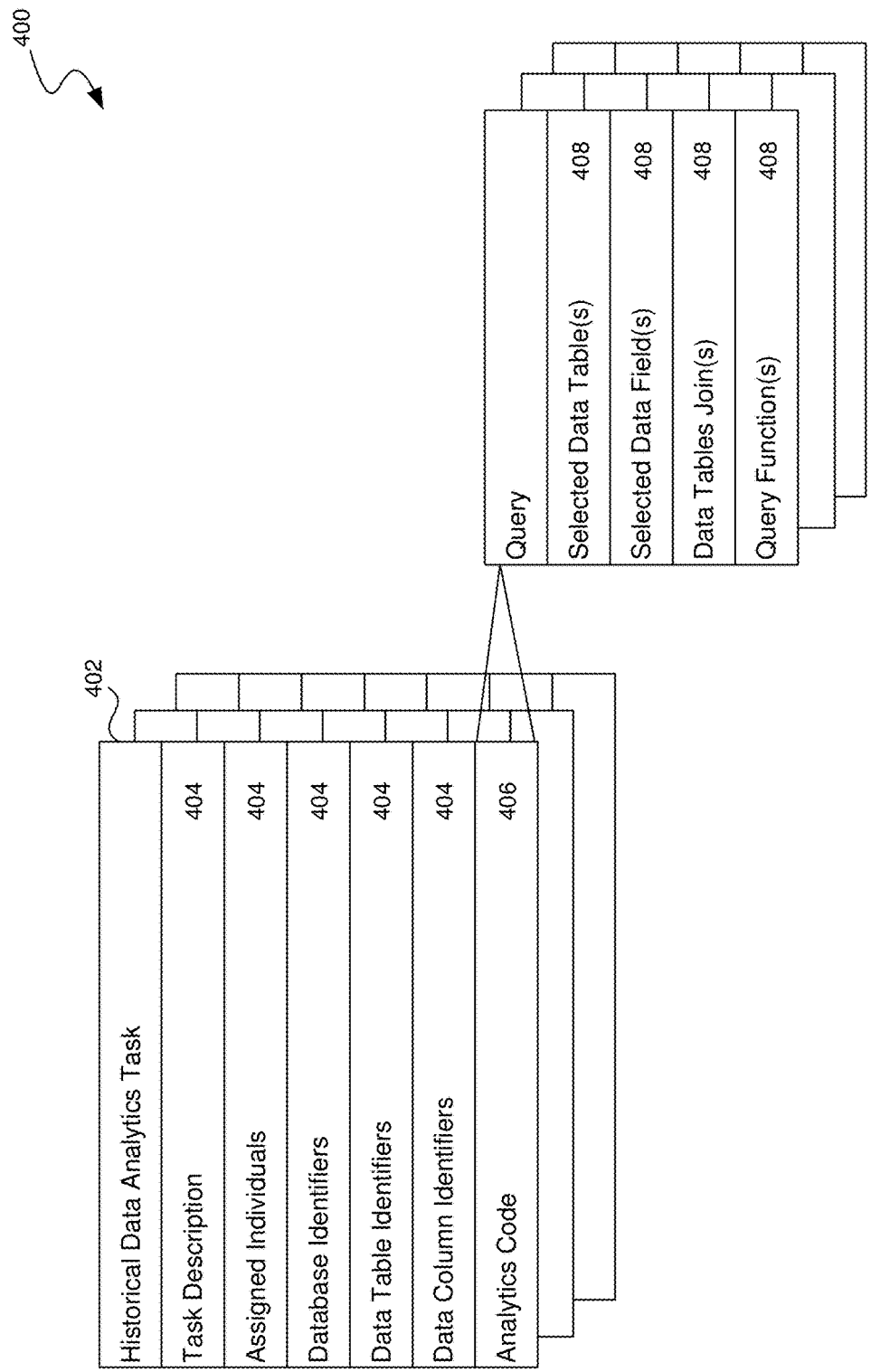
FIG. 4 is a data diagram of stored tasks and task parameters.

Implementations store historical data analytics tasks in association with parameters. FIG. 4 is a data diagram of stored tasks and task parameters. Diagram 400 includes data analytics task structure 402, parameters 404, analytics code parameter 406, and query parameters 408. Historical data analytics task 402 includes parameters 404, such as one or more task descriptions, one or more assigned individuals, one or more database identifiers, one or more data table identifiers, and one or more data column identifiers. In some implementations, analytics code parameter 406 for historical data analytics task 402 can be one or more stored search queries, and additional query parameters 408 can be stored based on the stored search queries.

For example, query parameters 408, such as data table(s) selected by the search query, data field(s) selected by the search query, data table join(s) included in the search query, query function(s) included in the search query, and other suitable query parameters, can be stored in relation to historical data analytics task 402 and/or analytics code parameter 408. In some implementations, query parameters 408 can be extracted based on an analysis of analytics code 406 by any known techniques. Data analytics task structure 402 and parameters 404 can correspond to a single historical data analytics task. Implementations can aggregate and store several (e.g., tens, hundreds, thousands, hundreds of thousands, millions, etc.) historical data analytics tasks and parameters to generate a corpus of data that can support match predictions for a new data analytics task.

Figure 5:
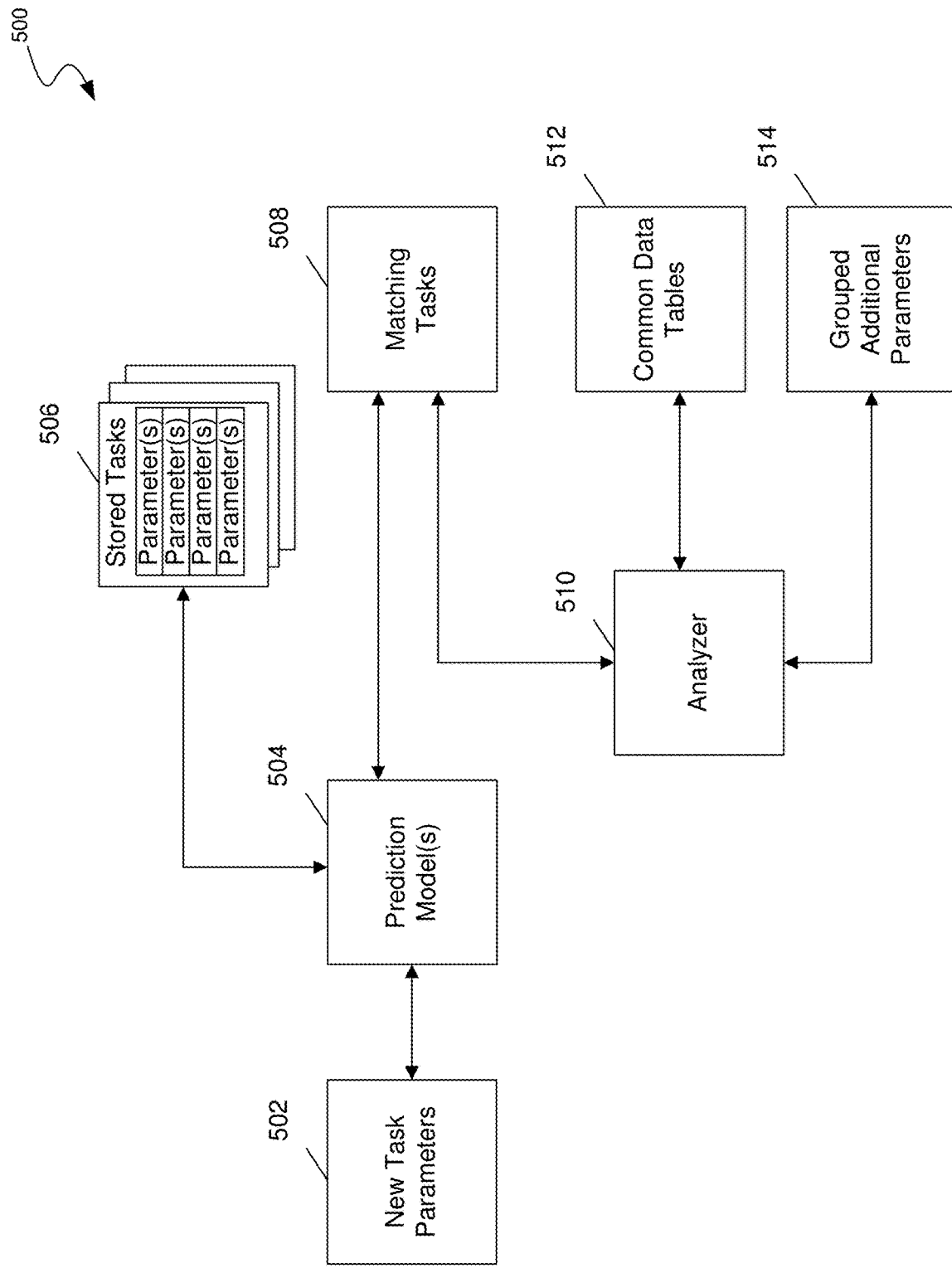
FIG. 5 is a conceptual diagram of prediction model(s) that generate historical analytics task match predictions for a new data analytics task.

FIG. 5 is a conceptual diagram of prediction model(s) that generate historical analytics task match predictions for a new data analytics task. Diagram 500 includes new task parameters 502, prediction model(s) 504, stored historical tasks 506, matching tasks 508, analyzer 510, common data tables 512, and grouped additional parameters 514. In some implementations, new task parameters 502 for a new data analytics task can include one or more of a task description, assigned individual(s), requesting entity, target databases, or any combination thereof.

New task parameters 502 can be provided to prediction model(s) 504 for match prediction generation. For example, prediction model(s) 504 can be configured to generate historical data analytics task matches using stored historical tasks 506 (e.g., an aggregate of historical data analytics tasks and parameters that represents a corpus of data). In some embodiments, stored parameters for the stored historical tasks 506 include task description, assigned individuals, requesting entity (e.g., name of requesting person, department, and the like), relevant databases, relevant data tables, relevant data columns, search queries and query parameters, data table joins, and other suitable parameters.

In some implementations, prediction model(s) 504 include at least one unsupervised learning model that generates similarity scores between new task parameters 502 and stored historical tasks 506 (e.g., based on similarities between new task parameters 502 and the stored parameters for each of the stored historical tasks 506). For example, the similarity scores for historical data analytics tasks that meet a similarity score criteria or threshold (e.g., configurable criteria or threshold for the unsupervised learning model, such as a hyperparameter) can be predicted as matches by prediction model(s) 504. The unsupervised machine learning model can be hierarchical clustering, K-means clustering, K nearest neighbor, or any other suitable unsupervised learning model.

In some implementations, new task parameters 502 include a task description that is compared to task descriptions for the stored historical tasks 506 to assess similarities. Example task descriptions include natural language text descriptive of the target data for the corresponding data analytics task. This comparison can be performed by projecting the natural language descriptions into a shared semantic space and comparing the projections to assess similarity. For example, Doc2Vec, or any other suitable tool, can be used to generate comparable embeddings for text descriptions.

In some implementations, prediction model(s) 504 predict matching tasks 508, or stored historical tasks 506 that comprise parameters that meet a similarity criteria with new task parameters 502. Analyzer 510 can analyze matching tasks 508 to determine common data tables 512 within matching tasks 508 and generate grouped additional parameters, for example grouped according to a specific one of common data tables 512, such as a data table selected by the user. The functionality of analyzer 510 and the generation of common data tables 512 and grouped additional parameters 514 is disclosed with reference to FIGS. 6 and 7.

Figure 6:
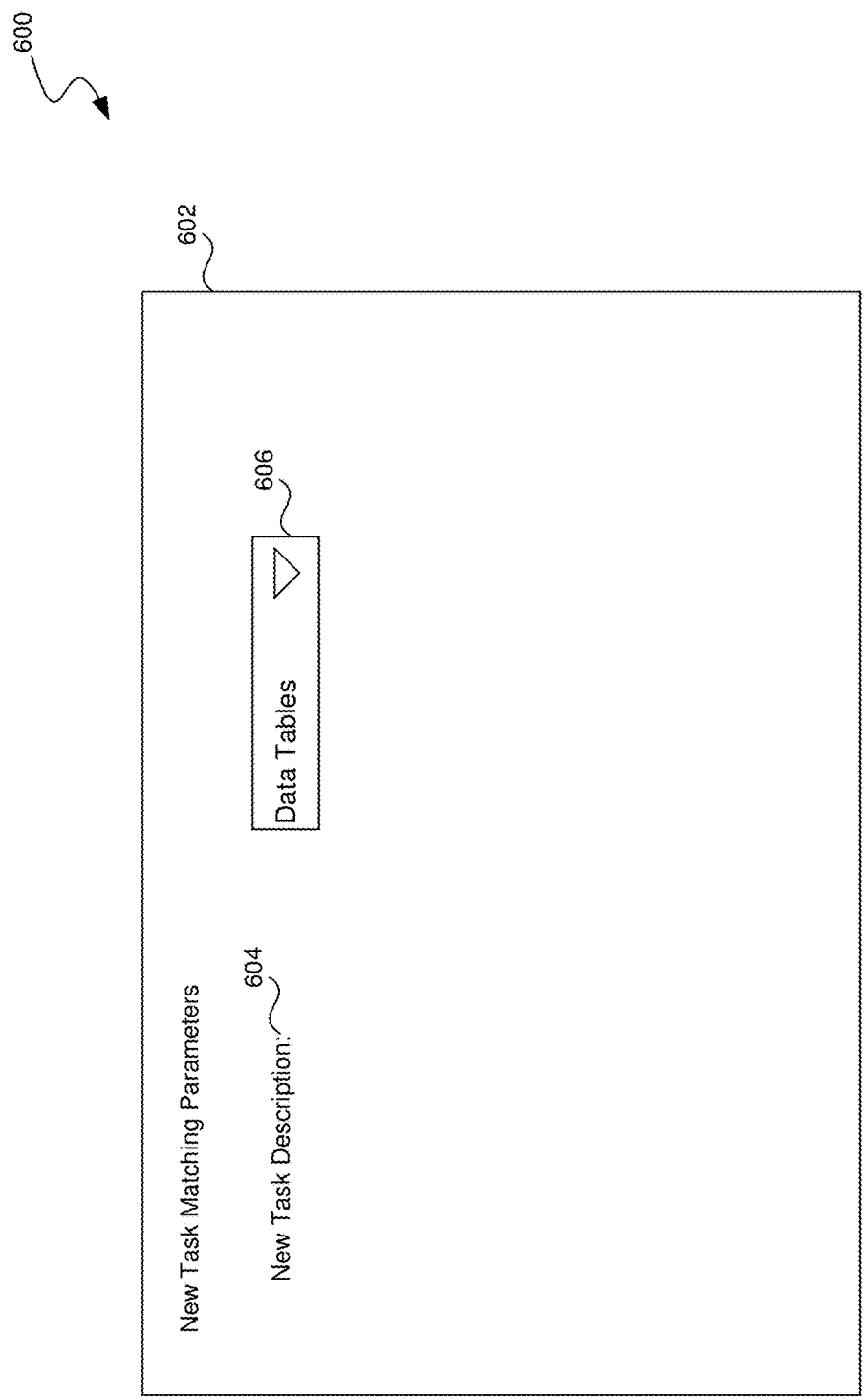
FIG. 6 is an example user interface for providing data tables that match a new data analytics task.

FIG. 6 is an example user interface for providing data tables that match a new data analytics task. Diagram 600 includes user interface 602, new task description 604, and data table selection element 606. For example, data table selection element 606 can be populated with data tables determined to be common from among a set of matching historical data analytics tasks (e.g., predicted by prediction model(s) based on parameters for a new data analytics task). Consider the following example set of matching historical data analytics tasks and parameters generated by prediction model(s) using: a) parameters for a new historical data analytics task; and b) a corpus of stored historical data analytics tasks and parameters:

| Task ID | Data tables | Assgn. Ind. | Task Desc. | Table Joins |
|---------|-------------|-------------|---------------|-------------|
| 1 | A, C, D | Ind. 1, 2 | [Description 1] | A Join C |
| 2 | F, G, H | Ind. 3, 4 | [Description 2] | NA |
| 3 | A, B | Ind. 1, 4 | [Description 3] | NA |
| 4 | C, H | Ind. 5, 6 | [Description 4] | C Join H |

In some implementations, each of tasks 1-4 includes stored queries not represented above. For the data tables A, B, C, D, F, G and H, a commonality number (e.g., number of matching tasks that include the data table as a parameter) for each can be calculated as: A:2, B:1, C:2, D:1, F:1, G:1, H:2. An example criteria for selection of common data tables can be a commonality number greater than or equal to 2, the 3 top ranked data tables according to commonality number, or any other suitable criteria. In this example, data tables A, C, and H are selected to be provided to the user. For example, data table selection element 606 can be populated with data tables A, C, and H. In some implementations, the user can select one of the data tables using data table selection element 606, such as data table A. Upon receiving the selection for data table A, user interface 602 can transition to user interface 702 of FIG. 7.

Figure 7:
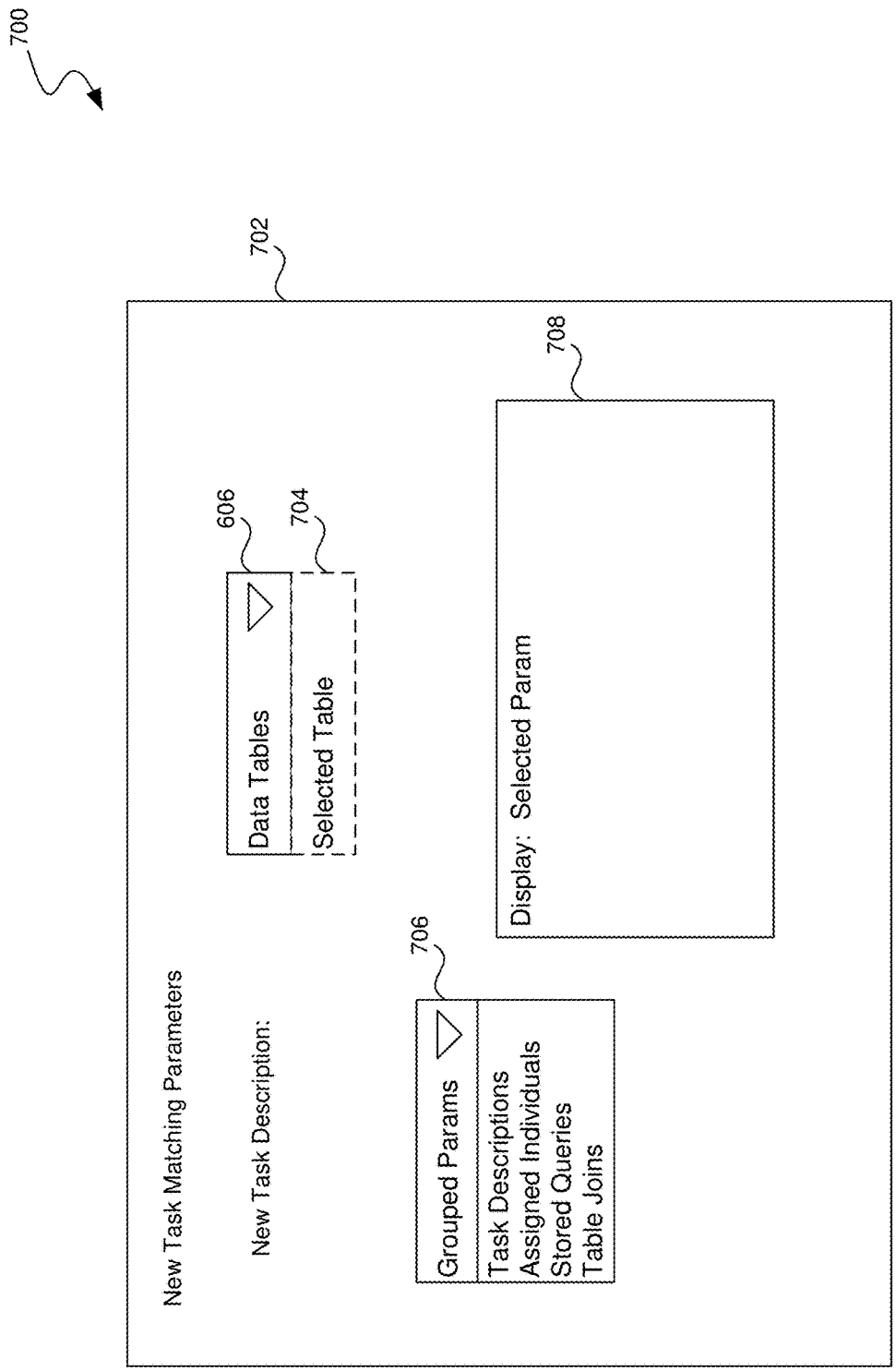
FIG. 7 is an example user interface for providing additional parameters that match a new data analytics task.

FIG. 7 is an example user interface for providing additional parameters that match a new data analytics task. Diagram 700 includes user interface 702, data table selection element 606, selected table 704, additional parameter selection element 706, and additional parameter display 708. Continuing the example where selected table 704 is data table A, additional parameters can be grouped according to the selection of data table A and the subset of tasks 1-4 that includes the selected data table as a parameter. In this example, the additional parameters for grouping include assigned individuals, task descriptions, table joins, and stored queries, as represented by additional parameter selection element 706.

The specific additional parameter values grouped within each additional parameter grouping are based on the matching tasks that include Table A as a parameter. For example, tasks 1 and 3 include Table A as a parameter, while tasks 2 and 4 do not. Accordingly, for each additional parameter (e.g., assigned individuals, task descriptions, table joins, and stored queries) the additional parameter values grouped are based on the parameters from tasks 1 and 3. For example, the grouping of assigned individuals includes individuals 1, 2, and 4, the grouping of task descriptions includes Description 1 and Description 4, the grouping of table joins includes A Joins C, and the grouping of stored queries includes the queries stored in association with task 1 and the queries stored in association with task 3. A user can select one of the additional parameters assigned individuals, task descriptions, table joins, and stored queries using additional parameter selection element 706, and the additional parameter values grouped under the selected additional parameter can be displayed at additional parameter display 708. The user can select multiple additional parameters in sequence using additional parameter selection element 706, and additional parameter display 708 will display the grouped additional parameter values for the currently selected additional parameter.

This example demonstrates a) data tables that are common among a set of historical data analytics tasks that match parameters for a new data analytics task, and b) groupings of additional parameters according to a user selected data table, the groupings of the additional parameters comprising parameter values from the set of historical data analytics tasks that comprise the selected data table as a parameter. The additional parameters grouped according to the selected data table can provide the user additional insight into: how the selected data table was used to perform historical data analytics tasks, such as within stored queries, how table joins were performed, etc.; which assigned individuals have experience with performing data analytics tasks using the selected table; and/or natural language understanding that indicates what target data was retrieved at least partly from the selected table. In addition, because the common data table selection and additional parameter groupings are performed using the set of matching historical data analytics tasks (e.g., tasks predicted to match the new data analytics task), the insights are configured to be particularly valuable to the new data analytics task.

In some implementations, data table selection element 606 can be used to select a different common data table, the additional parameters can be grouped according to the new selected common data table, the user can select the newly grouped additional parameters using additional parameter selection element 706, and additional parameter display 708 can display the newly grouped additional parameter values for the selected additional parameter. These implementations permit a user to explore the insights that the additional parameters provide across several common data tables.

Those skilled in the art will appreciate that the components illustrated in FIGS. 1-7 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 8:
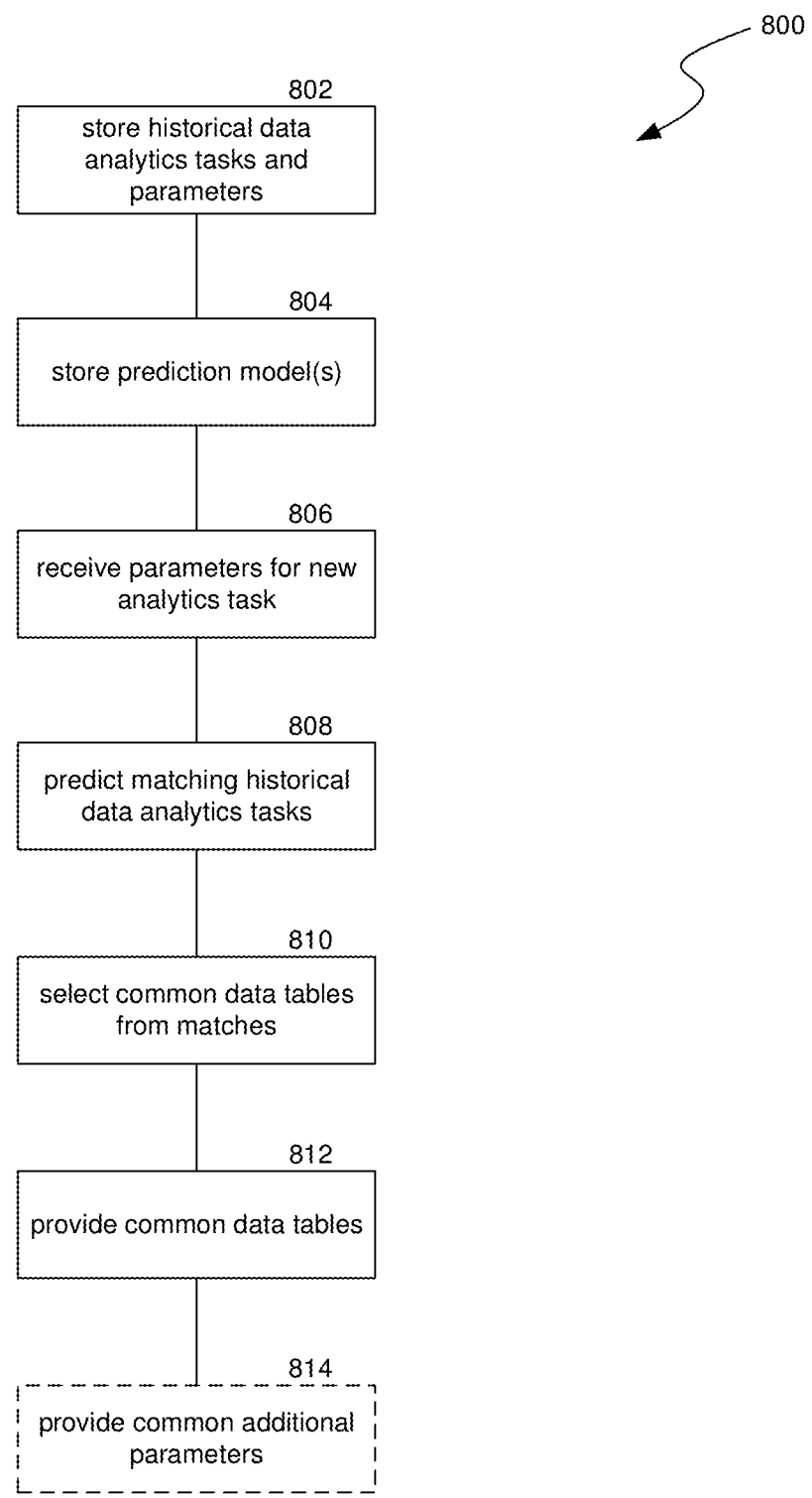
FIG. 8 is a flow diagram illustrating a process used in some implementations for selecting data analytics task components by matching stored parameters to a new data analytics task using one or more prediction models.

FIG. 8 is a flow diagram illustrating a process 800 used in some implementations for selecting data analytics task components by matching stored parameters to a new data analytics task using one or more prediction models. In some implementations, process 800 can be performed when a new data analytics task is created, initiated, or received. In some embodiments, process 800 can provide data tables relevant to the new data analytics task to a user.

At block 802, process 800 can store historical data analytics tasks and parameters. For example, a data analytics task can refer to a task that analyzes and queries one or more data sources (e.g., databases) to retrieve target data. Parameters for historical data analytics tasks can include a task description (e.g., natural language description of the target data), assigned individuals (e.g., person assigned the task), requesting entity (e.g., name of requesting person, department, and the like), relevant databases, relevant data tables, relevant data columns, search queries (e.g., structured query language (SQL) queries, or other suitable queries), data table joins, data table views, and other suitable parameters. Implementations can store historical data analytics tasks and their task parameters, for example in a database, such that one or more prediction models can match a new task to the historical tasks/task parameters.

At block 804, process 800 can store prediction model(s). Implementations of the prediction model(s) can be an unsupervised machine learning model, semi-supervised machine learning model, and/or a supervised learning model. In some implementations, an unsupervised machine learning model can learn from a data corpus without data labels, for example by using one or more clustering algorithms, such as hierarchical clustering, K-means clustering, K nearest neighbor, or any other suitable unsupervised learning model.

At block 806, process 800 can receive parameters for a new data analytics task. For example, parameters for the new data analytics task can be received from a user via a user interface, such as one or more of a task description, assigned individual(s), requesting entity, target databases, or any combination thereof.

At block 808, process 800 can predict matching historical data analytics tasks for the new data analytics task. For example, the prediction model(s) can be trained/configured to assess similarities between the new task parameters (e.g., input data) and the historical data analytics tasks/task parameters (e.g., data corpus) and output matching historical tasks with a similarity that meets or exceeds a criteria (e.g., similarity metric above a threshold). In some implementations, the prediction model(s) can include an unsupervised machine learning model with tunable hyperparameters, such as a similarity metric and/or threshold, output number for matching historical data analytical tasks, and other suitable hyperparameters. The outputted matching historical data analytics tasks can then be further analyzed to selectively provide parameters to the user.

At block 810, process 800 can select common data tables from the matching historical data analytics tasks. For example, the data table parameters stored in association with each of the matching historical data analytics tasks can be retrieved. Any other suitable technique to retrieve the data tables relevant to the matching historical data analytics tasks can be implemented. In some implementations, retrieved data tables that meet a criteria can be selected. For each data table, the number of matching historical data analytics tasks that include the data table as a parameter can be calculated.

This calculated number can represent a commonality for the data tables among the matching historical data analytics tasks. In some implementations, the data tables can be ranked according to this calculated commonality number. The ranking can indicate how commonly a data table was used when performing the matching historical data analytics tasks. In some implementations, the data tables that meet the criteria can include a defined number (e.g., 5, 7, 10, etc.) of highest ranked data tables or data tables that meet at least a threshold commonality number. Any other suitable technique can be used to select data tables using matching historical data analytics tasks.

At block 812, process 800 can provide the common data tables to the user. For example, the selected data tables (e.g., common data tables) can be provided to the user via a user interface. In some implementations the user can select one or more of the provided data tables (e.g., via the user interface) and additional parameters can be grouped according to the selection and provided to the user, as disclosed with reference to FIG. 9.

In some implementations, from block 812 process 800 can progress to block 814 without user selection of a common data table. For example, at block 814 process 800 can provide common additional parameters to the user. These common additional parameters can include, for example: assigned individuals common in the matching historical data analytics tasks, stored queries common in the matching historical data analytics tasks, table joins common in the matching historical data analytics tasks, and other suitable data analytics task parameters.

For example, for a given particular additional parameter (e.g., assigned individual, table join, etc.) the matching historical data analytics tasks will include parameter values for the particular additional parameters (e.g., one or more assigned individuals per task, one or more table joins per task, etc.). In some implementations, for each additional parameter value (e.g., within the matching historical data analytics tasks for the particular additional parameter), the number of matching historical data analytics tasks that include the additional parameter value can be calculated. For example, the matching historical data analytics tasks can include 10 different assigned individuals, where 3 of the tasks include a first of the assigned individuals as a stored parameter, 5 of the tasks include a second of the assigned individuals as a stored parameter, 2 of the tasks include a third of the assigned individuals as parameters, and so on. This calculated number can represent a commonality for the values of the particular additional parameter among the matching historical data analytics tasks.

Figure 9:
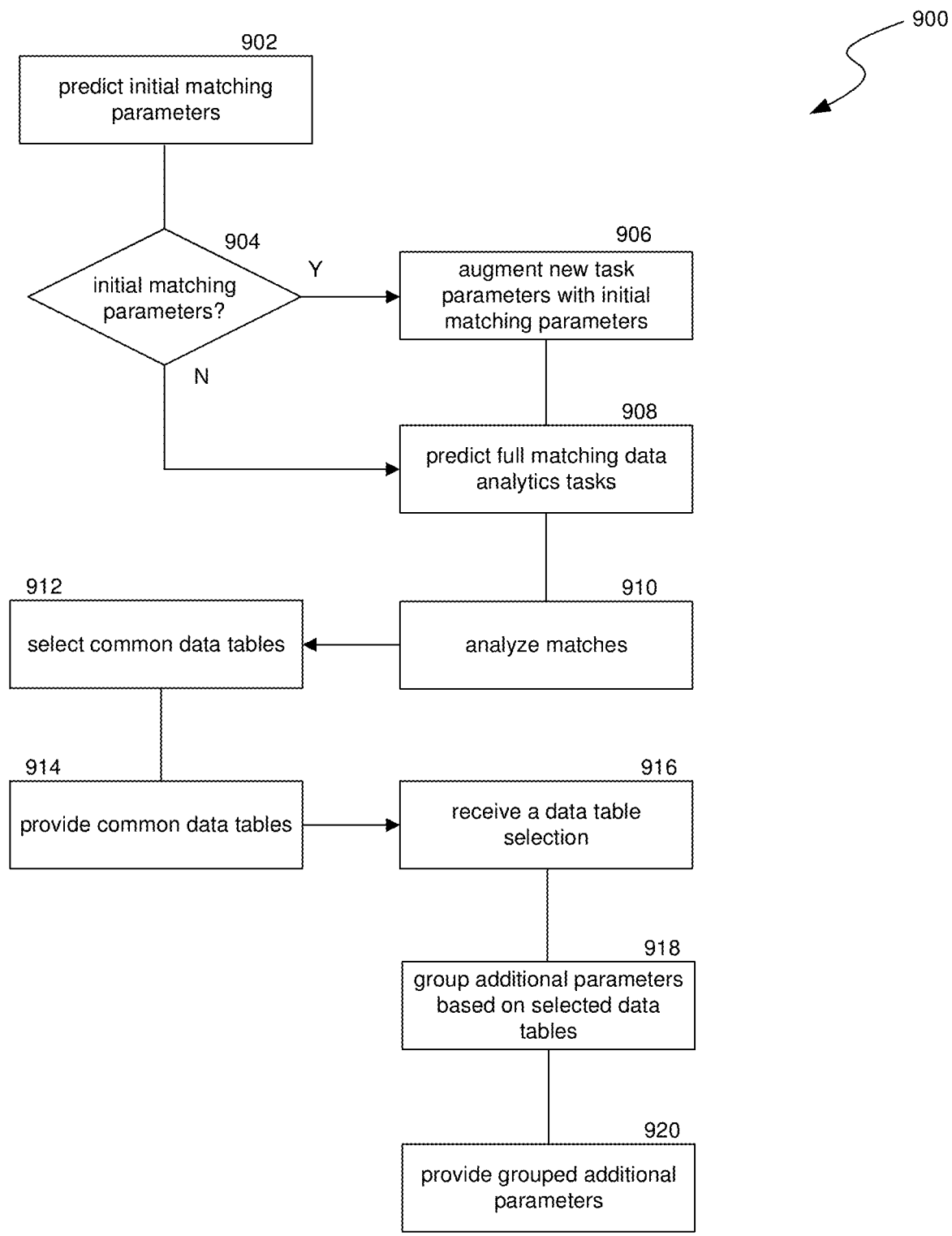
FIG. 9 is a flow diagram illustrating a process used in some implementations for analyzing and providing parameters predicted to match an augmented data analytics task using one or more prediction models.

In some implementations, values for the particular additional parameter can be ranked according to this calculated commonality number. The ranking can indicate how common an additional parameter value is within the matching historical data analytics tasks. The additional parameter values provided to a user for the particular additional parameter can include a subset of highest ranked values according to commonality. Any other suitable technique can be used to select common additional parameter values to provide to the user, FIG. 9 is a flow diagram illustrating a process used in some implementations for analyzing and providing parameters predicted to match an augmented data analytics task using one or more prediction models. In some implementations, process 900 can be performed when a new data analytics task is created, initiated, or received. In some embodiments, process 900 can provide data tables and additional parameters relevant to the new data analytics task to a user.

At block 902, process 900 can predict initial matching parameters for a new data analytics task. In some implementations, the received parameters for a new data analytics task may be limited, and therefore augmenting the parameters can result in higher quality matches predicted by prediction model(s). For example, one or more prediction models can be used to predict an initial set of matching parameters from historical data analytics tasks/parameters using the limited parameters for the new task.

In some implementations, the limited parameters for the new data analytics task can be a brief task description and a single assigned individual. Example initial matching parameters (from the historical data analytics tasks) predicted by prediction model(s) using the limited parameters can include additional assigned individuals, a requesting entity, one or more additional task descriptions, or any other suitable parameters.

At block 904, process 900 can determine whether initial matching parameters are predicted by one or more prediction model(s). For example, in some instances, prediction model(s) may not be able to predict the initial matching parameters using the limited parameters for a new data analytics task, such as due to very few or limited parameters, or limited parameters that are dissimilar from the parameters for stored historical data analytics tasks. In other instances, prediction model(s) will generate the initial set of matching parameters, for example when the limited parameters include enough information that is similar enough to the parameters for the stored historical data analytics tasks. When the one or more prediction model(s) generate the initial matching parameters, process 900 can progress to block 906. When the one or more prediction model(s) fail to generate the initial matching parameters, process 900 can progress to block 908.

At block 906, process 900 can augment the new task parameters with the initial matching parameters. For example, the limited parameters for the new data analytics task, such as a task description and single assigned individual, can be augmented with the initial matching parameters, such as one or more additional assigned individuals predicted to match the limited parameters, a requesting entity predicted to match the limited parameters, one or more additional task descriptions predicted to match the limited parameters, any combination thereof, or any other suitable initial matching parameters. In some embodiments, portions of the initial matching parameters can be used to augment the limited parameters for the new data analytics task.

At block 908, process 900 can predict full matching historical data analytics tasks using the original parameters for the new data analytics task or, if augmentation is performed, the original parameters and the augmented parameters. For example, the prediction model(s) can be trained/configured to assess similarities between the new task parameters/augmented parameters and the historical data analytics tasks/task parameters and output matching historical tasks with a similarity that meets or exceeds a criteria (e.g., similarity metric above a threshold). In some implementations, the prediction model(s) can include an unsupervised machine learning model with tunable hyperparameters, such as a similarity metric and/or threshold, output number for matching historical data analytical tasks, and other suitable hyperparameters.

In some implementations, parameters for the new data analytics task can be provided to prediction model(s) such that predicted matches of historical data analytics tasks can be generated by the model(s). In another example, parameters for the new data analytics task and augmented parameters can be provided to the prediction model(s) such that predicted matches of historical data analytics tasks can be generated by the model(s)

At block 910, process 900 can analyze the matching historical data analytics tasks. For example, the data table parameters stored in association with each of the matching historical data analytics tasks can be retrieved. Any other suitable technique to retrieve the data tables relevant to the matching historical data analytics tasks can be implemented.

For each data table, the number of matching historical data analytics tasks that include the data table as a parameter can be calculated. This calculated number can represent a commonality for the data tables among the matching historical data analytics tasks. In some implementations, the data tables can be ranked according to this calculated commonality number. The ranking can indicate how commonly a data table was used when performing the matching historical data analytics tasks.

At block 912, process 900 can select common data tables among the matching historical data analytics tasks. In some implementations, retrieved data tables that meet a criteria can be selected. For example, the data tables that meet the criteria can include a defined number (e.g., 5, 7, 10, etc.) of data tables highest ranked according to the calculated commonality numbers, or data tables that meet at least a threshold commonality number. Any other suitable technique can be used to select data tables using matching historical data analytics tasks.

At block 914, process 900 can provide the common data tables to the user. For example, the data tables (e.g., common data tables) can be provided to the user via a user interface. At block 916, process 900 can receive a data table selection from the user. For example, the users can select one of the provided common tables for further exploration via the user interface.

At block 918, process 900 can group additional parameters based on the selected data table. For example, for a selected data table, a subset of the matching historical data analytics tasks will include the selected data table as a parameter. For a given additional parameter (e.g., assigned individuals, task descriptions, table joins, stored queries, etc.), parameter values from these matching historical data analytics tasks that include the given data table can be retrieved, and the retrieved parameter values can be grouped. For example, the matching historical data analytics tasks that comprise the selected data table as a parameter can include several assigned individuals as parameters, and the several assigned individuals can be grouped.

In another example, the matching historical data analytics tasks that comprise the selected data table as a parameter can include several task descriptions as parameters, and the several task descriptions can be grouped. In another example, the matching historical data analytics tasks that comprise the selected data table as a parameter can include one or more data table joins as parameters, and the data table joins can be grouped.

At block 920, process 900 can provide the grouped additional parameters to the user. For example, according to the data table the user selected, the user can be provided the additional parameters and parameter values grouped for the selected data table. In some implementations, the user can be presented an input element at a user interface (e.g., drop-down menu, or any other suitable input element) that lists additional parameters for viewing. Using the input element, the user can select an additional parameter to view.

Upon selection, process 900 can display the additional parameter values, grouped for the selected data table, for the user. For example, when the user selects the "task description" additional parameter, the group of task descriptions displayed to the user includes task descriptions from matching historical data analytics tasks (e.g., that match a new data analytics task) that include the selected data table as a parameter. This group of task descriptions can provide the user natural language descriptions of historical data analytics tasks (e.g., predicted to match the new data analytics task) that were accomplished by retrieving data from the selected data table. Reviewing these natural language descriptions can provide knowledge to the user about how the selected data table has been historically used to accomplish data analytics tasks that match the user's new analytics task.

In another example, when "table joins" is selected as the additional parameter, the displayed group of table joins can indicate to the user which tables have been joined with the selected table to accomplish historical data analytics tasks. In another example, when "assigned individuals" is selected as the additional parameter, the displayed group of assigned individuals can indicate to the user which individuals have used the selected table to accomplish historical data analytics tasks (predicted to match the new task).

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for selecting data analytics task components using one or more prediction models, the method comprising:
   accessing, by a computing system, one or more previously stored prediction models configured to process previous data analytics task parameters, the one or more previously stored prediction models comprising one or more machine learning models;
   receiving, by the computing system, task parameters for a particular data analytics task;
   predicting, by the computing system and by providing the task parameters for the particular data analytics task to the one or more previously stored prediction models, a set of the previous data analytics tasks that match the particular data analytics task;
   selecting, by the computing system and using the set of matching previous data analytics tasks, a subset of common data tables that are associated with each of the set of the previous data analytics tasks that match the particular data analytics task; and
   providing, by the computing system, the subset of common data tables in relation to the particular data analytics task.

2. The method of claim 1, wherein the one or more previously stored prediction models comprise one or more unsupervised machine learning models configured to cluster analytics tasks by task parameters.

3. The method of claim 2, wherein the one or more previously stored prediction models are configured to determine similarity between the task parameters for the particular data analytics task and the task parameters for the previous data analytics tasks such that the set of matching previous data analytics tasks comprise a similarity that meets or exceeds a similarity criteria.

4. The method of claim 1, wherein the one or more previously stored prediction models were trained on task parameters, for at least a portion of the previous data analytics tasks, that comprise a search query used to search one or more data tables.

5. The method of claim 4, wherein the parameters for the portion of the previous data analytics tasks comprise one or more attributes of the search query, the attributes including data tables, data columns, data table joins, data query functions, or any combination thereof.

6. The method of claim 1, further comprising:
   receiving a selection for at least one of the subset of common data tables;
   grouping additional parameters for the selected data table, wherein the grouped additional parameters comprise parameter values from a subset of the matching previous data analytics tasks, the subset comprising matching previous data analytics tasks that include the selected data table as a parameter; and
   providing at least one of the grouped additional parameters.

7. The method of claim 6, wherein the at least one of the grouped additional parameters comprises a set of grouped task descriptions, wherein the set of grouped task descriptions comprise parameters for the subset of the matching previous data analytics tasks.

8. The method of claim 6, wherein the at least one of the grouped additional parameters comprises a set of grouped table joins, wherein the set of grouped table joins comprise parameters for the subset of the matching previous data analytics tasks.

9. The method of claim 1, further comprising:
   retrieving a set of data tables that comprise parameters for the matching previous data analytics tasks;
   calculating a commonality metric for each retrieved data table within the set, the commonality metric for a given table comprising the number of the matching previous data analytics tasks that comprise the given table as a parameter; and
   comparing the commonality metric for each retrieved data table from the set to a criteria, wherein the subset of common data tables comprise the data tables from the set with a commonality metric that meets the criteria.

10. A computer-readable storage medium storing instructions that, when executed by a computing system, cause the computing system to perform a process for selecting data analytics task components using one or more prediction models, the process comprising:
   accessing, by a computing system, one or more previously stored prediction models configured to process previous data analytics task parameters, the one or more previously stored prediction models comprising one or more machine learning models;
   receiving, by the computing system, task parameters for a particular data analytics task;

predicting, by the computing system and by providing the task parameters for the particular data analytics task to the one or more previously stored prediction models, a set of the previous data analytics tasks that match the particular data analytics task;

selecting, by the computing system and using the set of matching previous data analytics tasks, a subset of common data tables that are associated with each of the set of the previous data analytics tasks that match the particular data analytics task; and providing, by the computing system, the subset of common data tables in relation to the particular data analytics task.

11. The computer-readable storage medium of claim 10, wherein the process further comprises:

retrieving a set of data tables that comprise parameters for the matching previous data analytics tasks;

calculating a commonality metric for each retrieved data table within the set, the commonality metric for a given table comprising the number of the matching previous data analytics tasks that comprise the given table as a parameter; and comparing the commonality metric for each retrieved data table from the set to a criteria, wherein the subset of common data tables comprise the data tables from the set with a commonality metric that meets the criteria.

12. The computer-readable storage medium of claim 10, wherein the one or more previously stored prediction models comprise one or more unsupervised machine learning models configured to cluster analytics tasks by task parameters.

13. The computer-readable storage medium of claim 12, wherein the one or more previously stored prediction models are configured to determine similarity between the task parameters for the particular data analytics task and the task parameters for the previous data analytics tasks such that the set of matching previous data analytics tasks comprise a similarity that meets or exceeds a similarity criteria.

14. The computer-readable storage medium of claim 10, wherein the one or more previously stored prediction models were trained on task parameters, for at least a portion of the previous data analytics tasks, that comprise a search query used to search one or more data tables.

15. The computer-readable storage medium of claim 14, wherein the parameters for the portion of the previous data analytics tasks comprise one or more attributes of the search query, the attributes including data tables, data columns, data table joins, data query functions, or any combination thereof.

16. The computer-readable storage medium of claim 10, wherein the process further comprises:

receiving a selection for at least one of the subset of common data tables;

grouping additional parameters for the selected data table, wherein the grouped additional parameters comprise parameter values from a subset of the matching previous data analytics tasks, the subset comprising matching previous data analytics tasks that include the selected data table as a parameter; and providing at least one of the grouped additional parameters.

17. The computer-readable storage medium of claim 16, wherein the at least one of the grouped additional parameters comprises a set of grouped task descriptions, wherein the set of grouped task descriptions comprise parameters for the subset of the matching previous data analytics tasks.

18. The computer-readable storage medium of claim 16, wherein the at least one of the grouped additional parameters comprises a set of grouped table joins, wherein the set of grouped table joins comprise parameters for the subset of the matching previous data analytics tasks.

19. A computing system for selecting data analytics task components using one or more prediction models, the computing system comprising:

one or more processors; and one or more memories storing instructions that, when executed by the one or more processors, cause the computing system to perform a process comprising:

accessing, by a computing system, one or more previously stored prediction models configured to process previous data analytics task parameters, the one or more previously stored prediction models comprising one or more machine learning models;

receiving, by the computing system, task parameters for a particular data analytics task;

predicting, by the computing system and by providing the task parameters for the particular data analytics task to the one or more previously stored prediction models, a set of the previous data analytics tasks that match the particular data analytics task;

selecting, by the computing system and using the set of matching previous data analytics tasks, a subset of common data tables that are associated with each of the set of the previous data analytics tasks that match the particular data analytics task; and providing, by the computing system, the subset of common data tables in relation to the particular data analytics task.

20. The computing system of claim 19, wherein the one or more previously stored prediction models were trained on task parameters, for at least a portion of the previous data analytics tasks, that comprise a search query used to search one or more data tables.

* * * * *